United States Patent
Zhang et al.

(10) Patent No.: US 12,434,971 B2
(45) Date of Patent: Oct. 7, 2025

(54) COATED NANO-ORDERED CARBON PARTICLES AND METHODS FOR PREPARING THE SAME

(71) Applicant: PHILLIPS 66 COMPANY, Houston, TX (US)

(72) Inventors: Liang Zhang, Owasso, OK (US); Brian J. Worfolk, Raleigh, NC (US); James A. Enterkin, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 684 days.

(21) Appl. No.: 17/873,562

(22) Filed: Jul. 26, 2022

(65) Prior Publication Data

US 2023/0052554 A1     Feb. 16, 2023

Related U.S. Application Data

(60) Provisional application No. 63/304,978, filed on Jan. 31, 2022, provisional application No. 63/304,811, (Continued)

(51) Int. Cl.
    *C01B 32/15*         (2017.01)
    *C23C 16/26*         (2006.01)
    (Continued)

(52) U.S. Cl.
CPC .............. *C01B 32/15* (2017.08); *C23C 16/26* (2013.01); *H01M 4/583* (2013.01); *H01M 10/0525* (2013.01); *C01P 2004/61* (2013.01)

(58) Field of Classification Search
CPC ..... C01B 32/15; C23C 16/26; C23C 16/4417; H01M 4/583; H01M 10/0525;
(Continued)

(56) References Cited

U.S. PATENT DOCUMENTS

| | | | |
|---|---|---|---|
| 2012/0328880 A1* | 12/2012 | Asano | A61K 49/1818 |
| | | | 252/62.55 |
| 2015/0236343 A1* | 8/2015 | Xiao | H01M 4/13 |
| | | | 429/217 |

FOREIGN PATENT DOCUMENTS

| | | |
|---|---|---|
| EP | 1739771 | 8/2013 |
| EP | 3358656 | 12/2019 |

OTHER PUBLICATIONS

Ding (Characteristics of graphite anode modified by CVD carbon coating, 2005) (Year: 2005).*

* cited by examiner

*Primary Examiner* — Daniel C. McCracken
*Assistant Examiner* — Starfari Teshawn McClain
(74) *Attorney, Agent, or Firm* — Phillips 66 Company

(57) ABSTRACT

Embodiments of the present disclosure generally relate to carbon materials for battery electrodes and methods for preparing such carbon materials. More specifically, embodiments relate to coated nano-ordered carbon particles and methods for coating a carbon film onto carbonaceous particles to produce the coated nano-ordered carbon particles which can be used as an anode material within a rechargeable battery, such as a sodium-ion battery, other types of batteries. In one or more embodiments, a method for producing coated nano-ordered carbon particles is provided and includes exposing a carbon-containing material to an expanding agent to produce expanded carbonaceous particles during an expanding process, heating the expanded carbonaceous particles during an annealing process, and depositing a carbon film on the nano-ordered carbon particles to produce coated nano-ordered carbon particles during a carbon coating process.

16 Claims, 4 Drawing Sheets

Related U.S. Application Data filed on Jan. 31, 2022, provisional application No. 63/230,868, filed on Aug. 9, 2021.

(51) Int. Cl.
*H01M 4/583* (2010.01)
*H01M 10/0525* (2010.01)

(58) Field of Classification Search
CPC ........ H01M 4/366; H01M 4/62; H01M 4/587; C01P 2004/61; Y02E 60/10
See application file for complete search history.

COATED NANO-ORDERED CARBON PARTICLES AND METHODS FOR PREPARING THE SAME

CROSS-REFERENCE TO RELATED APPLICATIONS

This application is a Non-Provisional Patent Application which claims the benefit of and priority to U.S. Provisional Application Ser. No. 63/230,868 filed Aug. 9, 2021, entitled "Multi Functionalization of Petroleum Products", U.S. Provisional Application Ser. No. 63/304,811 filed Jan. 31, 2022, entitled "Methods for Preparing Nano-Ordered Carbon Products from Petroleum Streams" and U.S. Provisional Application Ser. No. 63/304,978 filed Jan. 31, 2022, entitled "Coated Carbonaceous Particles and Methods for Preparing the Same" all of which are hereby incorporated by reference in their entirety.

BACKGROUND

Field

Embodiments of the present disclosure generally relate to battery technology, and more specifically, methods for preparing carbon-based materials used in battery technology.

Description of the Related Art

Metal ion rechargeable batteries, especially lithium-ion batteries, are widely used secondary battery systems for portable electronic devices, electric vehicles, and other electrically powered devices. Lithium-ion battery technology has enjoyed a lot of attention in recent years and provides the preferred portable battery for most electronic devices in use today. However, lithium is not a cheap metal to source and is considered too expensive for use in large scale battery applications. Also, due to the growing demand for lithium-ion batteries, there is increasing concern about supplying lithium in a secure and sustainable way.

Replacing lithium with other ions such as sodium becomes an attractive alternative. Intercalation of $Na^+$ ions in graphite materials is difficult because the $Na^+$ ion is larger than the $Li^+$ ion. Therefore, it is necessary to identify a better host material for $Na^+$ ions and other larger ions. Hard carbon has been synthesized to replace graphite in sodium-ion batteries. Commercial hard carbon is derived mostly from pyrolysis of biomass feedstocks that contains significant amounts of oxygen or from pyrolysis of oxidized petroleum streams. Traditional hard carbon has reversible capacity in the range of about 280-300 mAh/g, which is still a lower than the lithium storage capacity in graphite which can be about 350 mAh/g. To boost the energy density of sodium-ion batteries, the anode material capacity needs to be further improved.

Therefore, there is a need for carbon-based anode materials which have an improved specific capacity (e.g., greater than 350 mAh/g) and first cycle efficiency (FCE) and hence capable of increasing the achievable energy density of the battery, such as a sodium-ion battery, and the methods for preparing these carbon-based anode materials.

SUMMARY

Embodiments of the present disclosure generally relate to carbon materials for battery electrodes and methods for preparing such carbon materials. More specifically, embodiments relate to coated nano-ordered carbon particles and methods for coating a carbon film onto carbonaceous particles to produce the coated nano-ordered carbon particles coated nano-ordered carbon particles which can be used as an anode material within a rechargeable battery, such as a sodium-ion battery, other types of batteries.

In one or more embodiments, a method for producing coated nano-ordered carbon particles is provided and includes exposing a carbon-containing material to an expanding agent to produce expanded carbonaceous particles during an expanding process, heating the expanded carbonaceous particles during an annealing process, and depositing a carbon film on the expanded carbonaceous particles to produce coated nano-ordered carbon particles during a carbon coating process.

In other embodiments, a method for producing coated nano-ordered carbon particles is provided and includes exposing a carbon-containing material to an expanding agent containing an alkaline compound to produce expanded carbonaceous particles during an expanding process and exposing the expanded carbonaceous particles to a neutralizing agent containing an acid to neutralize any remnants of the expanding agent during a neutralization process. The method further includes heating the expanded carbonaceous particles during an annealing process and depositing a carbon film on the expanded carbonaceous particles to produce coated nano-ordered carbon particles during a carbon coating process.

In some embodiments, a composition of coated nano-ordered carbon particles has a specific capacity of greater than 400 mAh/g in a battery voltage of about 0 V to about 3 V and a first cycle efficiency (FCE) of greater than 88%. The composition further includes that each coated carbonaceous particle contains a carbon film disposed over a porous carbonaceous particle, the expanded carbonaceous particles have an average particle size of about 1 μm to about 50 μm, and the carbon film has a thickness of about 1 nm to about 5 μm. In some examples, each of the coated nano-ordered carbon particles comprises a primary ordered structure and a secondary ordered structure. The primary ordered structure has a $d_{002}$ spacing which is an average interspacing between graphene layers. The secondary ordered structure has a $d_{NOS}$ spacing which is an average inter-pore spacing. In some examples, the $d_{002}$ spacing is about 3.5 Å to less than 4 Å and the $d_{NOS}$ spacing is about 15 Å to about 30 Å.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the Figures. It is contemplated that elements and features of one or more embodiments may be beneficially incorporated in other embodiments.

DETAILED DESCRIPTION

Figure 1:
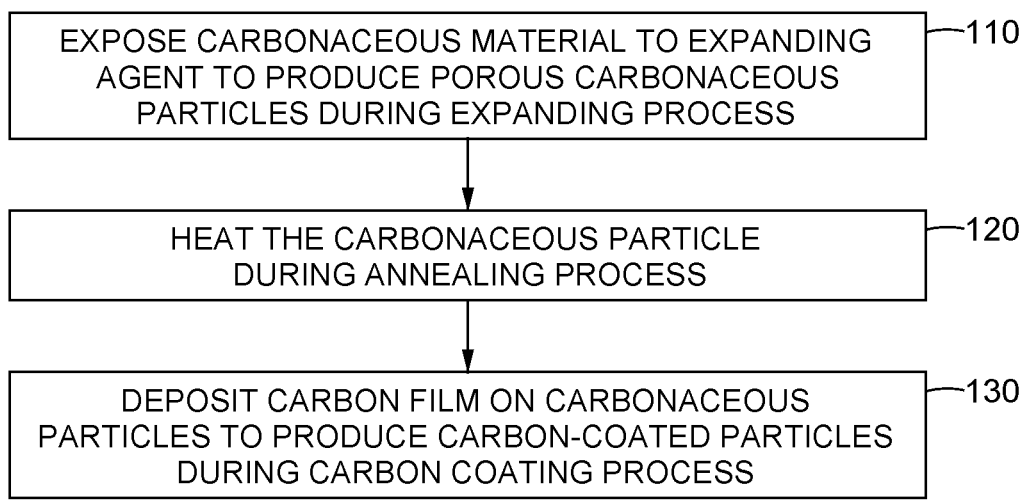
FIG. 1 is a flowchart illustrating a method for preparing coated nano-ordered carbon particles, according to one or more embodiments described and discussed herein.

Embodiments of the present disclosure generally relate to carbon materials for battery electrodes and methods for preparing such carbon materials. More specifically, embodiments relate to coated nano-ordered carbon particles and methods for preparing such particles. The coated nano-ordered carbon particles can be used as or within electrodes, such as an anode or an anode material. The coated nano-ordered carbon particles have two levels of nano-ordered structures which include a primary nano-ordered structure and a secondary a nano-ordered structure. As such, the abundant ion storage sites offered by the primary and secondary nano-ordered structure and coated nano-ordered carbon particles may increase the achievable capacity and improve the first cycle efficiency (FCE) for carbon-based anode materials when compared to traditional carbon materials, such as commercial hard carbon. The coating, such as a carbon coating, provides reduced parasitic side reactions when compared to particles without a carbon coating. The coated nano-ordered carbon particles can be used in a variety of batteries, including sodium-ion batteries and other metal-ion batteries.

An embodiment for producing coated nano-ordered carbon particles, comprising: exposing a carbon-containing material to an expanding agent to produce expanded carbonaceous particles during an expanding process; heating the expanded carbonaceous particles during an annealing process; and depositing a carbon film on the expanded carbonaceous particles with nano-ordered structure to produce coated nano-ordered carbon particles during a carbon coating process.

In one embodiment, the nano-ordered carbon and/or nano-ordered material comprises coal coke, petroleum coke, coal pitch, petroleum pitch, coal, a polymeric material, biomass, a bio-derived material, or any combination thereof. In another embodiment, the expanding agent comprises an alkaline compound, carbonate chemicals, steam, carbon dioxide, phosphoric acid, zinc chloride, aluminum chloride, magnesium chloride, or any combination thereof. In yet another embodiment, the expanding agent comprises sodium hydroxide, potassium hydroxide, lithium hydroxide, ammonium hydroxide, or any combination thereof.

In one embodiment, the mixture of the nano-ordered material and the expanding agent is heated to a temperature of about 400° C. to about 1,200° C. for about 5 minutes to about 6 hours during the expanding process. In yet another embodiment, after the expanding process and before the annealing process, the expanded carbonaceous particles are exposed to a neutralizing agent to neutralize any remnants of the expanding agent during a neutralization process.

In one embodiment, the expanded carbonaceous particles is heated to a temperature of about 800° C. to about 2,200° C. for about 5 minutes to about 10 hours during the annealing process. In yet another embodiment, the expanded carbonaceous particles have an average particle size of about 1 μm to about 50 μm. In an alternate embodiment, each of the expanded carbonaceous particles comprises: a primary ordered structure having a $d_{002}$ spacing which is an average interspacing between graphene layers and is about 3.4 Å to less than 4 Å; and a secondary ordered structure having a $d_{NOS}$ spacing which is which is an average inter-pore spacing and is about 15 Å to about 30 Å.

In one embodiment, the carbon coating process includes a vapor deposition process, and wherein the vapor deposition process comprises: positioning the expanded carbonaceous particles within a processing region of a processing chamber; heating the expanded carbonaceous particles to a process temperature; introducing a carbon-containing precursor into the processing region; and forming the carbon film from the carbon-containing precursor.

In one embodiment, the process temperature is about 500° C. to about 1,200° C., and the expanded carbonaceous particles are heated for about 10 minutes to about 6 hours. In yet another embodiment, the carbon-containing precursor comprises a solvent, an alkane, an alkene, an alkyne, an aromatic compound, or any combination thereof. Again in another embodiment, the carbon-containing precursor comprises toluene, methane, ethane, propane, butane, pentane, ethylene, propylene, butylene, acetylene, propyne, butyne, benzene, toluene, or any combination thereof.

In one embodiment, a carrier gas can be introduced with the carbon-containing precursor, wherein the carrier gas comprises nitrogen ($N_2$), argon, helium, or any combination thereof. In another embodiment, the vapor deposition process is a chemical vapor deposition (CVD) process or a pulsed-CVD process. In yet another embodiment, the carbon coating process includes a liquid deposition process.

In one embodiment, the liquid deposition process comprises: contacting the expanded carbonaceous particles with a liquid solution comprising a carbon-containing precursor; forming a solid film containing carbon on outer surfaces of the particles; and heating and carbonizing the solid film to form the carbon film on the expanded carbonaceous particles. In yet another embodiment, the liquid solution further comprises an organic solvent.

In one embodiment, the carbon film has a thickness of about 1 nm to about 5 μm. In yet another embodiment, the coated nano-ordered carbon particles have a first cycle efficiency (FCE) of greater than 88%. In another embodiment, the coated nano-ordered carbon particles exhibit a specific capacity of greater than 400 mAh/g in a battery voltage of about 0 V to about 3 V.

In one embodiment, each of the coated nano-ordered carbon particles comprises a primary ordered structure and a secondary ordered structure, the primary ordered structure has a $d_{002}$ spacing which is an average interspacing between graphene layers, the secondary ordered structure has a $d_{NOS}$ spacing which is an average inter-pore spacing. In yet another embodiment, the $d_{002}$ spacing is about 3.5 Å to less than 4 Å and the $d_{NOS}$ spacing is about 15 Å to about 30 Å.

A method for producing nano-ordered carbon coated nano-ordered carbon particles can also be taught, comprising: exposing a carbon-containing carbon nano-ordered material to an expanding agent comprising an alkaline compound to produce expanded carbonaceous particles during an expanding process; exposing the expanded carbonaceous particles to a neutralizing agent comprising an acid to neutralize any remnants of the expanding agent during a neutralization process; heating the expanded carbonaceous particles during an annealing process; and depositing a carbon film on the expanded carbonaceous particles with nano-ordered structure to produce coated nano-ordered carbon particles during a carbon coating process.

In another embodiment, a composition of coated nano-ordered carbon particles, can comprise: a specific capacity of greater than 400 mAh/g in a battery voltage of about 0 V to about 3 V; a first cycle efficiency of greater than 88%; and each coated nano-ordered carbon particle comprises a carbon film disposed over an expanded carbonaceous particle, wherein: the expanded carbonaceous particles have an average particle size of about 1 µm to about 50 µm; and the carbon film has a thickness of about 1 nm to about 5 µm.

In one embodiment, each of the coated nano-ordered carbon particles comprises a primary ordered structure and a secondary ordered structure, the primary ordered structure has a $d_{002}$ spacing which is an average interspacing between graphene layers, the secondary ordered structure has a $d_{NOS}$ spacing which is an average inter-pore spacing. In yet another embodiment, the $d_{002}$ spacing is about 3.4 Å to less than 4 Å and the $d_{NOS}$ spacing is about 15 Å to about 30 Å. In yet another embodiment, the specific capacity is about 450 mAh/g to about 600 mAh/g and the first cycle efficiency is about 89% to about 95%. Additionally, in one embodiment, the coated nano-ordered carbon particles is an anode material.

FIG. 1 is a flowchart illustrating a method 100 containing operations 110-130 for preparing or otherwise producing coated nano-ordered carbon particles, according to one or more embodiments described and discussed herein. The method 100 can include exposing a carbon-containing material and/or nano-ordered material to one or more expanding agents to produce expanded carbonaceous particles during an expanding process (operation 110), heating the expanded carbonaceous particles during an annealing process (operation 120), and depositing a carbon film on the expanded carbonaceous particles to produce coated nano-ordered carbon particles during a carbon coating process (operation 130). Each of the coated nano-ordered carbon particles has a core-shell structure such that the core contains one or more carbonaceous particles, and the shell contains one or more carbon films at least partially or completely around the core.

At operation 110, one or more carbon-containing materials and/or nano-ordered material can be combined with or otherwise exposed to one or more expanding agents during the expanding process. The carbon-containing material and/or nano-ordered material is expanded to produce expanded carbonaceous particles which have a greater porosity than the starting nano-ordered material. The expanded carbonaceous particles have larger and more pores which is favorable for sodium ions when used as a carbon-based anode material in a sodium-ion battery.

In one or more embodiments, the carbon-containing material can be or include any type of coke material (e.g., coal coke or petroleum coke), one or more other carbon-containing starting material (e.g., coal pitch, petroleum pitch, coal, one or more polymeric materials, biomass, one or more bio-derived materials), or any combination thereof. The carbon-containing material contains graphene layers or sheets have spacing therebetween. The average interspacing between the graphene layers is known as $d_{002}$ spacing. The carbon-containing material has a $d_{002}$ spacing of less than 3.6 Å, such as about 3.4 Å to about 3.5 Å. For comparison, hard carbon typically has a large $d_{002}$ spacing, such as from 3.6 Å to about 3.9 Å.

The expanding agent can be any type of compound or material used to increase the porosity of the nano-ordered material and/or carbon-containing material during the expanding process. Exemplary expanding agents can be or include one or more alkaline compounds, carbonate chemicals, steam (e.g., water vapor), carbon dioxide, phosphoric acid, zinc chloride, aluminum chloride, magnesium chloride, or any combination thereof. Exemplary alkaline compounds can be or include sodium hydroxide, potassium hydroxide, lithium hydroxide, ammonium hydroxide, or any combination thereof.

A mixture of the carbon-containing material and/or nano-ordered material and the expanding agent can be heated to a desired temperature for a desired time while producing the expanded carbonaceous particles during the expanding process. The mixture of the carbon-containing material and/or nano-ordered material and the expanding agent can be heated to a temperature from a minimum value of about 400° C., about 450° C., about 500° C., about 550° C., about 600° C., or about 700° C. to a maximum value about 750° C., about 800° C., about 900° C., about 1,000° C., about 1,100° C., about 1,200° C., about 1,300° C., about 1,500° C. or greater during the expanding process. For example, the mixture of the nano-ordered material and the expanding agent can be heated to a temperature of about 400° C. to about 1,200° C., about 400° C. to about 1,000° C., about 400° C. to about 900° C., about 400° C. to about 800° C., about 400° C. to about 700° C., about 400° C. to about 600° C., about 400° C. to about 500° C., about 600° C. to about 1,200° C., about 600° C. to about 1,000° C., about 600° C. to about 900° C., about 600° C. to about 800° C., about 600° C. to about 700° C., about 750° C. to about 1,200° C., about 750° C. to about 1,000° C., about 750° C. to about 900° C., or about 750° C. to about 800° C. during the expanding process.

The mixture of the carbon-containing material and/or nano-ordered material and the expanding agent can be heated and/or maintained at desired temperature for a time period from a minimum value of about 5 minutes, about 10 minutes, about 15 minutes, about 20 minutes, about 30 minutes, about 45 minutes, or about 60 minutes to about 75 minutes, about 90 minutes, about 2 hours, about 3 hours, about 4 hours, about 5 hours, about 6 hours, about 8 hours, about 10 hours, about 12 hours, or longer during the expanding process. For example, the mixture of the nano-ordered material and the expanding agent can be heated for about 5 minutes to about 12 hours, about 5 minutes to about 10 hours, about 5 minutes to about 8 hours, about 5 minutes to about 6 hours, about 5 minutes to about 4 hours, about 5 minutes to about 2 hours, about 5 minutes to about 1 hour, about 5 minutes to about 30 minutes, about 5 minutes to about 20 minutes, about 5 minutes to about 10 minutes, about 30 minutes to about 12 hours, about 30 minutes to about 10 hours, about 30 minutes to about 8 hours, about 30 minutes to about 6 hours, about 30 minutes to about 4 hours, about 30 minutes to about 2 hours, about 30 minutes to about 1 hour, about 30 minutes to about 45 minutes, about 1 hour to about 12 hours, about 1 hour to about 10 hours, about 1 hour to about 8 hours, about 1 hour to about 6 hours, about 1 hour to about 4 hours, about 1 hour to about 2 hours, or about 1 hour to about 1.5 hours during the expanding process.

The mixture of the carbon-containing material and/or nano-ordered material and the expanding agent can be heated and maintained under an atmosphere of a relatively inert gas (e.g., dinitrogen, argon, helium, or mixtures thereof) or can be maintained under a vacuum while producing the expanded carbonaceous particles during the expanding process. In one or more examples, the mixture of the carbon-containing material and/or nano-ordered material and the expanding agent can be heated to a temperature of about 400° C. to about 1,200° C. for about 5 minutes to about 6 hours during the expanding process. In other examples, the mixture of the carbon-containing material and/or nano-ordered material and the expanding agent can be heated to a temperature of about 600° C. to about 900° C. for about 10 minutes to about 2 hours during the expanding process.

In one or more embodiments, after the expanding process at operation 110 and before the annealing process at operation 120, the expanded carbonaceous particles can be optionally exposed to one or more neutralizing agent to neutralize any remnants of the expanding agent during a neutralization process. In some examples, the neutralizing agent can be or include one or more acids. For example, if the expanded carbonaceous particles contain any remnants of an alkaline compound used as the expanding agent, the expanded carbonaceous particles can be washed or otherwise rinsed with an acidic solution to neutralize or otherwise remove any alkaline compound. The acidic solution can be or include hydrochloric acid, sulfuric acid, nitric acid, acetic acid, or any combination thereof.

At operation 120, the expanded carbonaceous particles can be heated a vessel during the annealing process. Exemplary vessels can be or include a furnace, a tube furnace, a reactor (e.g., rotary reactor or fluidized bed reactor), an annealing chamber, a vapor deposition chamber (e.g., chemical vapor deposition (CVD) chamber or atomic layer deposition (ALD) chamber), or type of vessel used to heat materials during annealing processes. The expanded carbonaceous particles can be heated and maintained under an atmosphere of a relatively inert gas (e.g., dinitrogen, argon, helium, or mixtures thereof) or can be maintained under a vacuum while producing the expanded carbonaceous particles during the annealing process.

The expanded carbonaceous particles are heated to a temperature having a minimum value from about 700° C., about 800° C., about 900° C., about 1,000° C., about 1,100° C., or about 1,200° C. to a maximum value of about 1,300° C., about 1,500° C., about 1,650° C., about 1,800° C., about 2,000° C., about 2,100° C., about 2,200° C. or greater during the annealing process. For example, the expanded carbonaceous particles are heated to a temperature of about 700° C. to about 2,200° C., about 700° C. to about 2,000° C., about 700° C. to about 1,800° C., about 700° C. to about 1,600° C., about 700° C. to about 1,500° C., about 700° C. to about 1,350° C., about 700° C. to about 1,200° C., about 700° C. to about 1,000° C., about 700° C. to about 900° C., about 1,000° C. to about 2,200° C., about 1,000° C. to about 2,000° C., about 1,000° C. to about 1,800° C., about 1,000° C. to about 1,600° C., about 1,000° C. to about 1,500° C., about 1,000° C. to about 1,350° C., about 1,000° C. to about 1,200° C., about 1,300° C. to about 2,200° C., about 1,300° C. to about 2,000° C., about 1,300° C. to about 1,800° C., about 1,300° C. to about 1,600° C., about 1,300° C. to about 1,500° C., or about 1,300° C. to about 1,400° C. during the annealing process.

The expanded carbonaceous particles are heated to a temperature for a time period having a minimum value from about 1 minute, about 5 minutes, about 10 minutes, about 15 minutes, about 20 minutes, about 30 minutes, about 45 minutes, or about 1 hour to a maximum value of about 1.5 hours, about 2 hours, about 2 hours, about 3 hours, about 4 hours, about 5 hours, about 6 hours, about 8 hours, about 10 hours, about 12 hours, or longer during the annealing process. For example, the expanded carbonaceous particles are heated to a temperature for about 1 minute to about 12 hours, about 5 minutes to about 12 hours, about 5 minutes to about 10 hours, about 5 minutes to about 8 hours, about 5 minutes to about 5 hours, about 5 minutes to about 3 hours, about 5 minutes to about 2 hours, about 5 minutes to about 1 hour, about 5 minutes to about 30 minutes, about 5 minutes to about 20 minutes, about 5 minutes to about 10 minutes, about 30 minutes to about 12 hours, about 30 minutes to about 10 hours, about 30 minutes to about 8 hours, about 30 minutes to about 5 hours, about 30 minutes to about 3 hours, about 30 minutes to about 2 hours, about 30 minutes to about 1 hour, about 30 minutes to about 45 minutes, about 1 hour to about 12 hours, about 1 hour to about 10 hours, about 1 hour to about 8 hours, about 1 hour to about 5 hours, about 1 hour to about 3 hours, about 1 hour to about 2 hours, or about 1 hour to about 1.5 hours during the annealing process.

In one or more examples, the expanded carbonaceous particles are heated to a temperature of about 800° C. to about 2,200° C. for about 5 minutes to about 10 hours during the annealing process. In other examples, the expanded carbonaceous particles are heated to a temperature of about 1,000° C. to about 2,000° C. for about 10 minutes to about 2 hours during the annealing process. In some examples, the expanded carbonaceous particles are heated to a temperature of about 1,200° C. to about 1,800° C. for about 15 minutes to about 1 hour during the annealing process.

At operation 130, subsequent to the annealing process, a carbon film can be deposited, formed, or otherwise produced on or over the expanded carbonaceous particles by one or more carbon coating processes to produce coated nano-ordered carbon particles. The carbon coating process can be or include one or more vapor deposition processes and/or one or more liquid deposition processes. Exemplary vapor deposition processes can be or include a thermal chemical vapor deposition (CVD) process, a plasma-enhanced CVD (PECVD), a pulsed-CVD process, a thermal atomic layer deposition (ALD) process, a plasma-enhanced-ALD process, or any combination thereof. Exemplary liquid deposition processes can be or include solvent deposition process, a spin coating process, or other processes utilizing a liquid phase of a precursor to the deposited layer or film. The carbon coating process can be performed in the same processing chamber or vessel, or a different processing chamber or vessel as used in the annealing process. For example, the carbon coating process can be performed a vapor deposition chamber (e.g., CVD chamber or ALD chamber), a furnace, a tube furnace, a reactor, an annealing chamber, or other type of processing chamber having a processing region configured to conduct the carbon coating process. In one or more examples, the processing chamber for conducting the carbon coating process can be a rotary tube reactor manufactured by Sentro or Harper.

In one or more examples, the vapor deposition process includes positioning the expanded carbonaceous particles within or passing the expanded carbonaceous particles within the processing region of the processing chamber, heating the expanded carbonaceous particles to a process temperature, introducing a carbon-containing precursor into the processing region, and forming the carbon film from the carbon-containing precursor. In one or more embodiments, an inert gas or a purge gas can be introduced into the processing region prior to introducing the carbon-containing precursor. In some examples, the introduction of the inert or purge gas into the processing region is ceased and a flow of carbon-containing precursor is introduced into the processing region and exposed to the expanded carbonaceous particles during the vapor deposition process. The flow rate is adjusted based on many variables, such as the volume size of the process region, the types of precursors, the reaction temperature, the desired film thickness, and the desired deposition rate, among other conditions.

In one or more examples, the carbon-containing precursor can have a flow rate from a minimum value of about 100 mL/min, about 150 mL/min, about 200 mL/min, about 300 mL/min, about 400 mL/min, or about 500 mL/min to a maximum value of about 600 mL/min, about 800 mL/min, about 1,000 mL/min, about 1,500 mL/min, about 2,000 mL/min, about 3,000 mL/min, about 4,000 mL/min, about 5,000 mL/min, or greater during the vapor deposition process. For examples, the carbon-containing precursor can have a flow rate of about 100 mL/min to about 5,000 mL/min, about 100 mL/min to about 4,000 mL/min, about 100 mL/min to about 3,000 mL/min, about 100 mL/min to about 2,000 mL/min, about 100 mL/min to about 1,000 mL/min, about 100 mL/min to about 500 mL/min, about 100 mL/min to about 350 mL/min, about 100 mL/min to about 200 mL/min, about 500 mL/min to about 5,000 mL/min, about 500 mL/min to about 4,000 mL/min, about 500 mL/min to about 3,000 mL/min, about 500 mL/min to about 2,000 mL/min, about 500 mL/min to about 1,000 mL/min, about 500 mL/min to about 800 mL/min, about 1,000 mL/min to about 5,000 mL/min, about 1,000 mL/min to about 4,000 mL/min, about 1,000 mL/min to about 3,000 mL/min, about 1,000 mL/min to about 2,000 mL/min, about 1,000 mL/min to about 1,500 mL/min during the vapor deposition process.

The carbon-containing precursor can include one or more organic compounds and optionally include one or more carrier gases or one or more dilution gases. The carbon-containing precursor can be or contain one or more solvents, one or more alkanes, one or more alkenes, one or more alkynes, one or more aromatic compounds, one or more cyclic compounds, other organic compounds, or any combination thereof. Exemplary carbon-containing precursor can be or include toluene, methane, ethane, propane, butane, pentane, ethylene, propylene, butylene, acetylene (ethyne), propyne, butyne, benzene, toluene, or any combination thereof. In some examples, one or more carrier gases and/or one or more dilution gases can be introduced or combined with the carbon-containing precursor. Exemplary carrier gases or dilution gases can be or include nitrogen ($N_2$), argon, helium, neon, or any combination thereof.

The carbon-containing precursor can include the one or more organic compounds at a concentration of a minimum value from about 1 vol % (volume percent), about 2 vol %, about 5 vol %, about 10 vol %, or about 15 vol % to a maximum value of about 20 vol %, about 30 vol %, about 50 vol %, about 80 vol %, about 95 vol %, about 99 vol %, or about 100 vol %, and the remainder of carbon-containing precursor can be the carrier gas and/or the dilution gas. For example, the carbon-containing precursor can include about 1 vol % to about 100 vol %, about 1 vol % to about 99 vol %, about 1 vol % to about 95 vol %, about 1 vol % to about 90 vol %, about 1 vol % to about 75 vol %, about 1 vol % to about 50 vol %, about 1 vol % to about 40 vol %, about 1 vol % to about 20 vol %, about 1 vol % to about 10 vol % of the one or more organic compounds.

In one or more examples, the carbon-containing precursor contains about 1 vol % to about 100 vol % of acetylene or another organic compound and from none to about 99 vol % of the carrier gas and/or the dilution gas (e.g., $N_2$). In other examples, the carbon-containing precursor contains about 1 vol % to about 50 vol % of acetylene or another organic compound and about 50 vol % to about 99 vol % of the carrier gas and/or the dilution gas. In one or more examples, the carbon-containing precursor contains about 1 vol % to about 20 vol % of acetylene or another organic compound and about 80 vol % to about 99 vol % of the carrier gas and/or the dilution gas. In other examples, the carbon-containing precursor contains about 2 vol % to about 10 vol % of acetylene or another organic compound and about 90 vol % to about 98 vol % of the carrier gas and/or the dilution gas. In other examples, the carbon-containing precursor contains about 4 vol % to about 6 vol % of acetylene or another organic compound and about 94 vol % to about 96 vol % of the carrier gas and/or the dilution gas.

The expanded carbonaceous particles are heated to and/or maintained at a process temperature during the vapor deposition process. The expanded carbonaceous particles are heated to a process temperature having a minimum value from about 500° C., about 550° C., about 600° C., about 650° C., about 700° C., or about 720° C. to a maximum value of about 730° C., about 750° C., about 780° C., about 800° C., about 850° C., about 900° C., about 930° C., about 950° C., about 980° C., about 1,000° C., about 1,100° C., about 1,200° C., about 1,500° C., about 1,800° C., about 2,000° C., about 2,200° C., or greater during the vapor deposition process. For example, the expanded carbonaceous particles are heated to a process temperature of about 500° C. to about 2,200° C., about 500° C. to about 2,000° C., about 500° C. to about 1,800° C., about 500° C. to about 1,500° C., about 500° C. to about 1,200° C., about 500° C. to about 1,000° C., about 500° C. to about 800° C., about 500° C. to about 650° C., about 600° C. to about 2,200° C., about 600° C. to about 2,000° C., about 600° C. to about 1,800° C., about 600° C. to about 1,600° C., about 600° C. to about 1,200° C., about 600° C. to about 1,000° C., about 600° C. to about 800° C., about 600° C. to about 700° C., about 750° C. to about 2,200° C., about 750° C. to about 2,000° C., about 750° C. to about 1,800° C., about 750° C. to about 1,750° C., about 750° C. to about 1,200° C., about 750° C. to about 1,000° C., or about 750° C. to about 900° C. during the vapor deposition process.

The expanded carbonaceous particles are heated to the desired temperature for a time period having a minimum value from about 0.5 minutes, about 1 minute, about 2 minutes, about 3 minutes, about 5 minutes, about 10 minutes, about 15 minutes, about 20 minutes, about 30 minutes, about 40 minutes, or about 1 hour to a maximum value of about 1.2 hours, about 1.5 hours, about 1.8 hours, about 2 hours, about 2.2 hours, about 2.5 hours, about 2.8 hours, about 3 hours, about 4 hours, about 5 hours, about 6 hours, or longer during the vapor deposition process. For example, the expanded carbonaceous particles are heated to the desired temperature for about 5 minutes to about 6 hours, about 10 minutes to about 6 hours, about 10 minutes to about 5 hours, about 10 minutes to about 4 hours, about 10 minutes to about 3 hours, about 10 minutes to about 2 hours, about 10 minutes to about 1.5 hours, about 10 minutes to about 1 hour, about 10 minutes to about 45 minutes, about 10 minutes to about 30 minutes, about 10 minutes to about 20 minutes, about 30 minutes to about 6 hours, about 30 minutes to about 5 hours, about 30 minutes to about 4 hours, about 30 minutes to about 3 hours, about 30 minutes to about 2 hours, about 30 minutes to about 1.5 hours, about 30 minutes to about 1 hour, about 30 minutes to about 45 minutes, about 1 hour to about 6 hours, about 1 hour to about 5 hours, about 1 hour to about 4 hours, about 1 hour to about 3 hours, about 1 hour to about 2 hours, about 1 hour to about 1.5 hours, or about 1 hour to about 1.2 hours during the vapor deposition process.

In one or more examples, the expanded carbonaceous particles are heated to a process temperature of about 500° C. to about 1,200° C. for about 10 minutes to about 6 hours during the vapor deposition process. In some examples, the expanded carbonaceous particles are heated to a process temperature of about 550° C. to about 1,000° C. for about 30 minutes to about 4 hours during the vapor deposition process. In other examples, the expanded carbonaceous particles are heated to a process temperature of about 600° C. to about 900° C. for about 1 hour to about 3 hours during the vapor deposition process.

In some embodiments, the carbon film can be deposited, formed, or otherwise produced on or over the expanded carbonaceous particles by one or more liquid deposition processes to produce coated nano-ordered carbon particles. The liquid deposition process can include contacting the expanded carbonaceous particles with a liquid solution containing one or more carbon-containing precursor, forming a solid film containing carbon on the outer surfaces of the particles by removing the solvent or cooling down the liquid solution or precursor, and heating and carbonizing the solid film at an elevated temperature (e.g., about 500° C. to about 1,500° C.) to form or otherwise produce the carbon film on the coated nano-ordered carbon particles. In some examples, the liquid solution containing the carbon-containing precursor can also contain one or more organic solvents. Exemplary organic solvents can be or include one or more alkanes (e.g., C4-C10 alkanes including butane, pentane, hexane, heptane, octane, nonane, decane), benzene, toluene, xylene, isomers thereof, functionalized derivatives thereof, halogenated derivatives thereof, or any combination thereof. In other examples, the liquid solution containing the carbon-containing precursor lacks or is substantially free of a solvent.

The expanded carbonaceous particles have an average particle size having a minimum value from about 1 μm, about 3 μm, about 5 μm about 8 μm, or about 10 μm to a maximum value of about 12 μm, about 15 μm, about 20 μm, about 25 μm, about 30 μm, about 40 μm, about 50 μm, about 80 μm, or about 100 μm. For example, the expanded carbonaceous particles have an average particle size of about 1 μm to about 100 μm, about 1 μm to about 80 μm, about 1 μm to about 50 μm, about 1 μm to about 40 μm, about 1 μm to about 30 μm, about 1 μm to about 25 μm, about 1 μm to about 20 μm, about 1 μm to about 10 μm, about 1 μm to about 5 μm, about 5 μm to about 100 μm, about 5 μm to about 80 μm, about 5 μm to about 50 μm, about 5 μm to about 40 μm, about 5 μm to about 30 μm, about 5 μm to about 25 μm, about 5 μm to about 20 μm, about 5 μm to about 10 μm, about 10 μm to about 100 μm, about 10 μm to about 80 μm, about 10 μm to about 50 μm, about 10 μm to about 40 μm, about 10 μm to about 30 μm, about 10 μm to about 25 μm, about 10 μm to about 20 μm, or about 10 μm to about 15 μm.

In one or more embodiments, the expanded carbonaceous particles contain greater than 95 wt % (weight percent) of the nano-ordered material and/or nano-ordered material. The expanded carbonaceous particles contain a concentration of the nano-ordered material and/or nano-ordered material having a minimum value from about 95.5 wt %, about 96 wt %, or about 97 wt % to a maximum value of about 98 wt %, about 98.5 wt %, about 99 wt %, about 99.5 wt %, about 99.9 wt %, or 100 wt % of hard carbon. For example, the expanded carbonaceous particles contain about 95.5 wt % to about 100 wt %, about 95.5 wt % to about 99.9 wt %, about 96 wt % to about 99.9 wt %, about 97 wt % to about 99.9 wt %, about 98 wt % to about 99.9 wt %, about 99 wt % to about 99.9 wt %, about 99.5 wt % to about 99.9 wt %, about 95.5 wt % to about 99 wt %, about 96 wt % to about 99 wt %, about 97 wt % to about 99 wt %, or about 98 wt % to about 99 wt % of the nano-ordered material and/or nano-ordered material.

The carbon film on or over the expanded carbonaceous particles has a thickness having a minimum value from about 1 nm, about 2 nm, about 3 nm, about 5 nm, about 8 nm, about 10 nm, about 12 nm, or about 15 nm to a maximum value of about 18 nm, about 20 nm, about 25 nm, about 30 nm, about 50 nm, about 80 nm, about 100 nm, about 150 nm, about 200 nm, about 300 nm, about 500 nm, about 800 nm, about 1 μm, about 2 μm, about 3 μm, or about 5 μm. For example, the carbon film on or over the expanded carbonaceous particles has a thickness of about 1 nm to about 5 μm, about 1 nm to about 3 μm, about 1 nm to about 2 μm, about 1 nm to about 1 μm, about 1 nm to about 500 nm, about 1 nm to about 300 nm, about 1 nm to about 200 nm, about 1 nm to about 100 nm, about 1 nm to about 50 nm, about 1 nm to about 20 nm, about 1 nm to about 10 nm, about 1 nm to about 5 nm, about 5 nm to about 5 μm, about 5 nm to about 3 μm, about 5 nm to about 2 μm, about 5 nm to about 1 μm, about 5 nm to about 500 nm, about 5 nm to about 300 nm, about 5 nm to about 200 nm, about 5 nm to about 100 nm, about 5 nm to about 50 nm, about 5 nm to about 20 nm, about 5 nm to about 10 nm, about 50 nm to about 5 μm, about 50 nm to about 3 μm, about 50 nm to about 2 μm, about 50 nm to about 1 μm, about 50 nm to about 500 nm, about 50 nm to about 300 nm, about 50 nm to about 200 nm, about 50 nm to about 100 nm, or about 50 nm to about 80 nm.

The carbon film contains greater than 95 wt % of carbon. The carbon film contains carbon at a concentration of a minimum value from about 95.5 wt %, about 96 wt %, or about 97 wt % to a maximum value of about 98 wt %, about 98.5 wt %, about 99 wt %, about 99.5 wt %, about 99.9 wt %, or 100 wt % of carbon. For example, the carbon film contains about 95.5 wt % to about 100 wt %, about 95.5 wt % to about 99.9 wt %, about 96 wt % to about 99.9 wt %, about 97 wt % to about 99.9 wt %, about 98 wt % to about 99.9 wt %, about 99 wt % to about 99.9 wt %, about 99.5 wt % to about 99.9 wt %, about 95.5 wt % to about 99 wt %, about 96 wt % to about 99 wt %, about 97 wt % to about 99 wt %, or about 98 wt % to about 99 wt % of carbon.

The coated nano-ordered carbon particles have an average particle size slightly larger than the average particle size of the underlying expanded carbonaceous particles before being coated. The average particle size coated nano-ordered carbon particles is about two times the thickness of the film coating the underlying expanded carbonaceous particles. The coated nano-ordered carbon particles have an average particle size of a minimum value from about 1 μm, about 3 μm, about 5 μm about 8 μm, or about 10 μm to a maximum value of about 12 μm, about 15 μm, about 20 μm, about 25 μm, about 30 μm, about 40 μm, about 50 μm, about 80 μm, or about 100 μm. For example, the coated nano-ordered carbon particles have an average particle size of about 1 μm to about 100 μm, about 1 μm to about 80 μm, about 1 μm to about 50 μm, about 1 μm to about 40 μm, about 1 μm to about 30 μm, about 1 μm to about 25 μm, about 1 μm to about 20 μm, about 1 μm to about 10 μm, about 1 μm to about 5 μm, about 5 μm to about 100 μm, about 5 μm to about 80 μm, about 5 μm to about 50 μm, about 5 μm to about 40 μm, about 5 μm to about 30 μm, about 5 μm to about 25 μm, about 5 μm to about 20 μm, about 5 μm to about 10 μm, about 10 μm to about 100 μm, about 10 μm to about 80 μm, about 10 μm to about 50 μm, about 10 μm to about 40 µm, about 10 µm to about 30 µm, about 10 µm to about 25 µm, about 10 µm to about 20 µm, or about 10 µm to about 15 µm.

In one or more embodiments, the expanded carbonaceous particles and the coated nano-ordered carbon particles have two levels of nano-ordered structures which include a primary nano-ordered structure and a secondary a nano-ordered structure. As such, each of the expanded carbonaceous particles and each of the coated nano-ordered carbon particles have a primary nano-ordered structure having $d_{002}$ spacing, which is an average interspacing between neighboring graphene layers, of less than 4 Å. The primary nano-ordered structure can have a $d_{002}$ spacing of about 3.4 Å, about 3.5 Å, about 3.6 Å, about 3.7 Å, about 3.8 Å, about 3.9 Å, or less than 4 Å. Each of the expanded carbonaceous particles and each of the coated nano-ordered carbon particles have a secondary nano-ordered structure having $d_{NOS}$ spacing, which is an average inter-pore spacing or the average distance between stack centers, of about 15 Å or greater. The secondary nano-ordered structure can have $d_{NOS}$ spacing of about 15 Å to about 30 Å, about 15 Å to about 25 Å, about 15 Å to about 22 Å, about 15 Å to about 20 Å, about 15 Å to about 18 Å, about 20 Å to about 30 Å, about 20 Å to about 25 Å, about 20 Å to about 22 Å, about 22 Å to about 30 Å, or about 22 Å to about 25 Å. In one or more examples, the primary ordered structure has a $d_{002}$ spacing of about 3.4 Å to less than 4 Å and the secondary ordered structure has a $d_{NOS}$ spacing of about 15 Å to about 30 Å.

In one or more embodiments, the coated nano-ordered carbon particles exhibit a specific capacity of greater than 350 mAh/g in a battery voltage of about 0 V to about 3 V. The coated nano-ordered carbon particles exhibit a specific capacity having a minimum value from about 360 mAh/g, about 400 mAh/g, about 430 mAh/g, about 440 mAh/g, about 450 mAh/g, or about 475 mAh/g to a maximum value of about 480 mAh/g, about 500 mAh/g, about 520 mAh/g, about 535 mAh/g, about 550 mAh/g, about 580 mAh/g, about 600 mAh/g, about 620 mAh/g, about 635 mAh/g, about 650 mAh/g, or greater. For example, the coated nano-ordered carbon particles exhibit a specific capacity of about 410 mAh/g to about 650 mAh/g, about 420 mAh/g to about 650 mAh/g, about 420 mAh/g to about 600 mAh/g, about 420 mAh/g to about 550 mAh/g, about 420 mAh/g to about 500 mAh/g, about 420 mAh/g to about 480 mAh/g, about 420 mAh/g to about 450 mAh/g, about 450 mAh/g to about 650 mAh/g, about 450 mAh/g to about 600 mAh/g, about 450 mAh/g to about 550 mAh/g, about 450 mAh/g to about 500 mAh/g, about 450 mAh/g to about 480 mAh/g, about 500 mAh/g to about 650 mAh/g, about 500 mAh/g to about 600 mAh/g, about 500 mAh/g to about 550 mAh/g, or about 500 mAh/g to about 520 mAh/g. In some examples, the coated nano-ordered carbon particles exhibit a specific capacity of greater than 400 mAh/g or greater than 440 mAh/g in a battery voltage of about 0 V to about 3 V, such as about 410 mAh/g to about 600 mAh/g, about 430 mAh/g to about 600 mAh/g, about 450 mAh/g to about 600 mAh/g, about 470 mAh/g to about 550 mAh/g, or about 480 mAh/g to about 520 mAh/g.

The coated nano-ordered carbon particles exhibit a first cycle efficiency (FCE) of greater than 88% in a battery voltage of about 0 V to about 3 V. The coated nano-ordered carbon particles have an FCE of a minimum value from greater than 88%, about 88.2%, about 88.5%, about 89%, or about 90% to a maximum value of about 90.2%, about 90.5%, about 91%, about 92%, about 93%, about 94%, about 95%, about 96%, or greater. For example, the coated nano-ordered carbon particles have an FCE of greater than 88% to about 96%, greater than 88% to about 95%, greater than 88% to about 94%, greater than 88% to about 93%, greater than 88% to about 92%, greater than 88% to about 91%, greater than 88% to about 90%, about 89% to about 96%, about 89% to about 95%, about 89% to about 94%, about 89% to about 93%, about 89% to about 92%, about 89% to about 91%, about 89% to about 90%, about 90% to about 96%, about 90% to about 95%, about 90% to about 94%, about 90% to about 93%, about 90% to about 92%, or about 90% to about 91%.

The method 100 for preparing or otherwise producing the coated nano-ordered carbon particles can include and/or omit different operations 110-130 and/or processes as described and discussed herein. The method 100 can also include other processes before, after, in between, or during any of the operations 110-130. In one or more examples, the method 100 includes exposing one or more carbon-containing materials to one or more expanding agents to produce expanded carbonaceous particles during the expanding process (operation 110) and heating the expanded carbonaceous particles during the annealing process (operation 120). The method 100 further includes depositing the carbon film on the expanded carbonaceous particles to produce coated nano-ordered carbon particles during the carbon coating process (operation 130).

In other examples, the method 100 includes exposing the carbon-containing material to the expanding agent containing the alkaline compound to produce expanded carbonaceous particles during the expanding process (operation 110) and exposing the expanded carbonaceous particles to the neutralizing agent containing the acid to neutralize any remnants of the expanding agent during the neutralization process. The method 100 further includes heating the expanded carbonaceous particles during the annealing process (operation 120) and depositing the carbon film on the expanded carbonaceous particles to produce coated nano-ordered carbon particles during the carbon coating process (operation 130).

In one or more embodiments, the method 100 can be used to produce the coated nano-ordered carbon particles as described and discussed herein. In some examples, the coated nano-ordered carbon particles, a composition of coated nano-ordered carbon particles has a specific capacity of greater than 400 mAh/g or greater than 440 mAh/g, such as about 450 mAh/g to about 600 mAh/g, in a battery voltage of about 0 V to about 3 V and an FCE of greater than 88%, such as about 89% to about 95%. Each of the coated nano-ordered carbon particles contains a carbon film disposed over a porous carbonaceous particle, the expanded carbonaceous particles have an average particle size of about 1 µm to about 50 µm, and the carbon film has a thickness of about 1 nm to about 5 µm. In some embodiments, an anode contains the coated nano-ordered carbon particles and can be used in a metal-ion battery, such as a sodium-ion battery.

Examples

In order to provide a better understanding of the foregoing discussion, the following non-limiting examples are offered. Although the examples can be directed to specific embodiments, they are not to be viewed as limiting the invention in any specific respect.

It is theorized that the coated nano-ordered carbon particles provided positive results due to the proper nano-ordered structure generated by expanding of precursors and the carbon film on the carbonaceous particles, as highlighted in the below Examples. The coated nano-ordered carbon particles provides improved properties over the commercially available hard carbon in a sodium-ion battery.

Example 1. Coke was chosen as a feedstock because coke is readily available in refineries at mass scale and coke products have defined specifications to ensure consistent quality. Coke material is characteristic with relatively tighter d-spacing (d002=about 3.4 Å to about 3.5 Å), compared to regular hard carbon (d002=about 3.6 Å to about 3.8 Å), and low porosity. In a typical experiment, about 10 g of coke was carbonized and annealed in a nitrogen atmosphere at ambient pressure using a laboratory tube furnace. The processing temperature was between 900 and 1200° C. and the holding time was 2 h. The carbon product was labeled as E1.

Example 2. About 10 g of coke was carbonized and annealed in a nitrogen atmosphere at ambient pressure using a laboratory tube furnace. The processing temperature was higher than that in Example 1 and ranged between 1200 and 1500° C. and the holding time was 2 h. The carbon product was labeled as E2.

Example 3. About 10 g of coke is mixed with about 5 g to about 20 g of KOH and heated in a nitrogen atmosphere at ambient pressure to about 600° C. to about 900° C. The thermal processing would expand the coke material into expanded coke with nano-ordered structure (d002 is larger than 3.6 Å, dNOS is about 15 Å to about 30 Å). The expanded coke was washed with 1-3M HCl solution to remove residual expanding agent and subsequently sent to a tube furnace to anneal in a nitrogen atmosphere at ambient pressure at about 1300° C. to about 1500° C. The annealed intermediate still has open pore structure on the surface that might contribute to unwanted side reactions between electrolyte/solvent and carbon surface. To minimize the side reactions, a surface carbon coating is applied to the annealed intermediate to form a core-shell structure. In a typical experiment, about 1 g of the intermediate (porous carbonaceous particles) was uniformly spread on a flat substrate with <1 mm thickness and then set in the middle of a tube reactor. The system temperature was raised to about 600° C. to about 900° C. at a ramp rate of 5° C./min with 300 sccm $N_2$ flow. Upon reaching the desired temperature, the $N_2$ flow was switched to flow through a bubbler containing toluene. After reaction for 2 h, the gas flow was switched back to pure $N_2$ line. The coated nano-ordered carbon particle was labeled as E3.

Example 4. About 10 g of coke is mixed with higher ratio of KOH (about 20 g to about 60 g of KOH) and heated in a nitrogen atmosphere at ambient pressure to about 600° C. to about 900° C. The thermal processing would expand the coke material into highly porous coke (d002 is larger than 4 Å, dNOS is about 15 Å to about 30 Å). The intermediate was washed with 1-3M HCl solution to remove residual expanding agent and subsequently sent to a tube furnace to anneal in a nitrogen atmosphere at ambient pressure at about 1300° C. to about 1500° C. The annealed intermediate still has open pore structure on the surface that might contribute to unwanted side reactions between electrolyte/solvent and carbon surface. To minimize the side reactions, a surface carbon coating is applied to the annealed intermediate to form a core-shell structure. In a typical experiment, about 1 g of the intermediate (porous carbonaceous particles) was uniformly spread on a flat substrate with <1 mm thickness and then set in the middle of a tube reactor. The system temperature was raised to about 600° C. to about 900° C. at a ramp rate of 5° C./min with 300 sccm $N_2$ flow. Upon reaching the desired temperature, the $N_2$ flow was switched to flow through a bubbler containing toluene. After reaction for 2 h, the gas flow was switched back to pure $N_2$ line. The coated nano-ordered carbon particle was labeled as E4.

Example 5. About 10 g of coke is mixed with about 5 g to about 20 g of KOH and heated in a nitrogen atmosphere at ambient pressure to about 600° C. to about 900° C. The thermal processing would expand the coke material into expanded coke with nano-ordered structure (d002 is larger than 3.6 Å, dNOS is about 15 Å to about 30 Å). The expanded coke was washed with 1-3M HCl solution to remove residual expanding agent and subsequently sent to a tube furnace to anneal in a nitrogen atmosphere at ambient pressure at lower temperature than that in Example 3 and 4 (about 900° C. to about 1200° C.). The annealed intermediate still has open pore structure on the surface that might contribute to unwanted side reactions between electrolyte/solvent and carbon surface. To minimize the side reactions, a surface carbon coating is applied to the annealed intermediate to form a core-shell structure. In a typical experiment, about 1 g of the intermediate (porous carbonaceous particles) was uniformly spread on a flat substrate with <1 mm thickness and then set in the middle of a tube reactor. The system temperature was raised to about 600° C. to about 900° C. at a ramp rate of 5° C./min with 300 sccm $N_2$ flow. Upon reaching the desired temperature, the $N_2$ flow was switched to flow through a bubbler containing toluene. After reaction for 2 h, the gas flow was switched back to pure $N_2$ line. The coated nano-ordered carbon product was labeled as E5.

XRD analysis was conducted on the nano-ordered carbon materials made from Examples 1-4. Samples for XRD analysis were packed loosely onto a silicon wafer low-background XRD sample holder and leveled to achieve a flat surface. XRD data was acquired on a diffractometer operated in θ-θ geometry with a copper X-ray source (Cu kα λ=1.54059 Å), divergent beam primary beam X-ray optics, and a Vantec1 position sensitive detector.

The samples of from Examples 1-5 were further made into electrodes and tested in Na ion half-cells. The electrodes were prepared by casting a well-mixed dispersion of coated nano-ordered carbon particles:alginate binder:carbon black (90:5:5 in weight) in water onto a carbon-coated aluminum substrate with a doctor blade to form a thin film. The electrode film was then dried in a vacuum oven at 80° C. for 1 h. Disks with 1.5 cm diameter were punched out from the electrode films using a die cutter (MTI™ MSK-T-07). The mass loading of active materials on these disks varied from 5 to 6 mg/disc. Each sodium ion coin cell was prepared in an argon-filled glovebox by sequentially stacking a Na metal as anode, a separator (a layer of Whatman® glass fiber filter), an electrode disk as cathode, a stainless steel disk spacer, and a wave spring in a bottom can. An electrolyte of 1 M $NaPF_6$ in 50 vol % ethylene carbonate and 50 vol % dimethyl carbonate (purchased from Sigma-Aldrich®) was added to the separator before the electrode disk was stacked. After the top can was placed over the bottom can, the assembly was crimped and sealed by a coin cell crimper (MTI™ MSK-110). The electrochemical tests were performed on a battery tester (Arbin®). The electrical charge passed during each charge/discharge cycle was recorded and used to calculate the specific capacity and coulombic efficiency. All the tests were conducted at ambient temperature.

Figure 2:
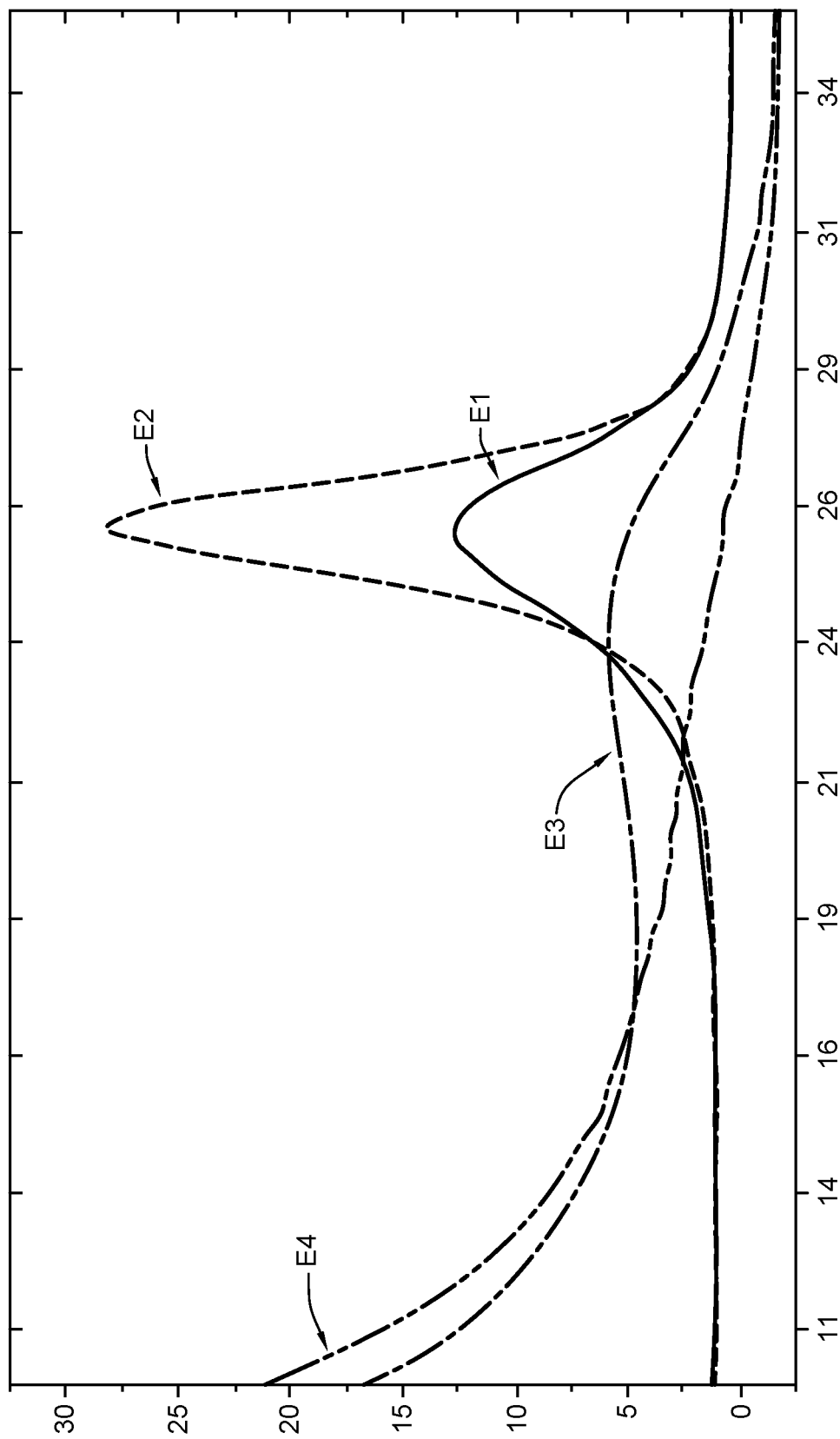
FIG. 2 is a graph illustrating XRD spectra as described and discussed in one or more embodiments herein.

As shown in FIG. 2, Sample E1 and E2 from Examples 1 and 2 respectively were generated from direct carbonization of coke material in an inert environment. As expected, E1 and E2 have structures similar to soft carbon with reasonably good crystallinity, which is evidenced by the sharp d002 peaks in FIG. 2. Sample E2, due to higher carbonization temperature, showed higher crystallinity than E1. The calculated average d002 spacings for E1 and E2 are 3.48 and 3.47 Å respectively. After reacting with proper amount of expanding agent and subsequent annealing process, the coke was expanded to a nano-ordered carbon material (E3) with relatively lower crystallinity. As shown in FIG. 2, E3 demonstrated broader and shifted d002 peak than E1 and E2. The calculated average d002 spacing is ~3.7 Å, larger than that of E1 and E2. However, the coke could be over-expanded at higher expending agent to coke ratio, such as in Example 4. In this case, the nano-ordered carbon product (E4), which was carbonized at the same temperature as E3, showed minimal crystallinity with widespread d002 spacing (largest FWHM) and largest average d002 (>4 Å).

Figure 3:
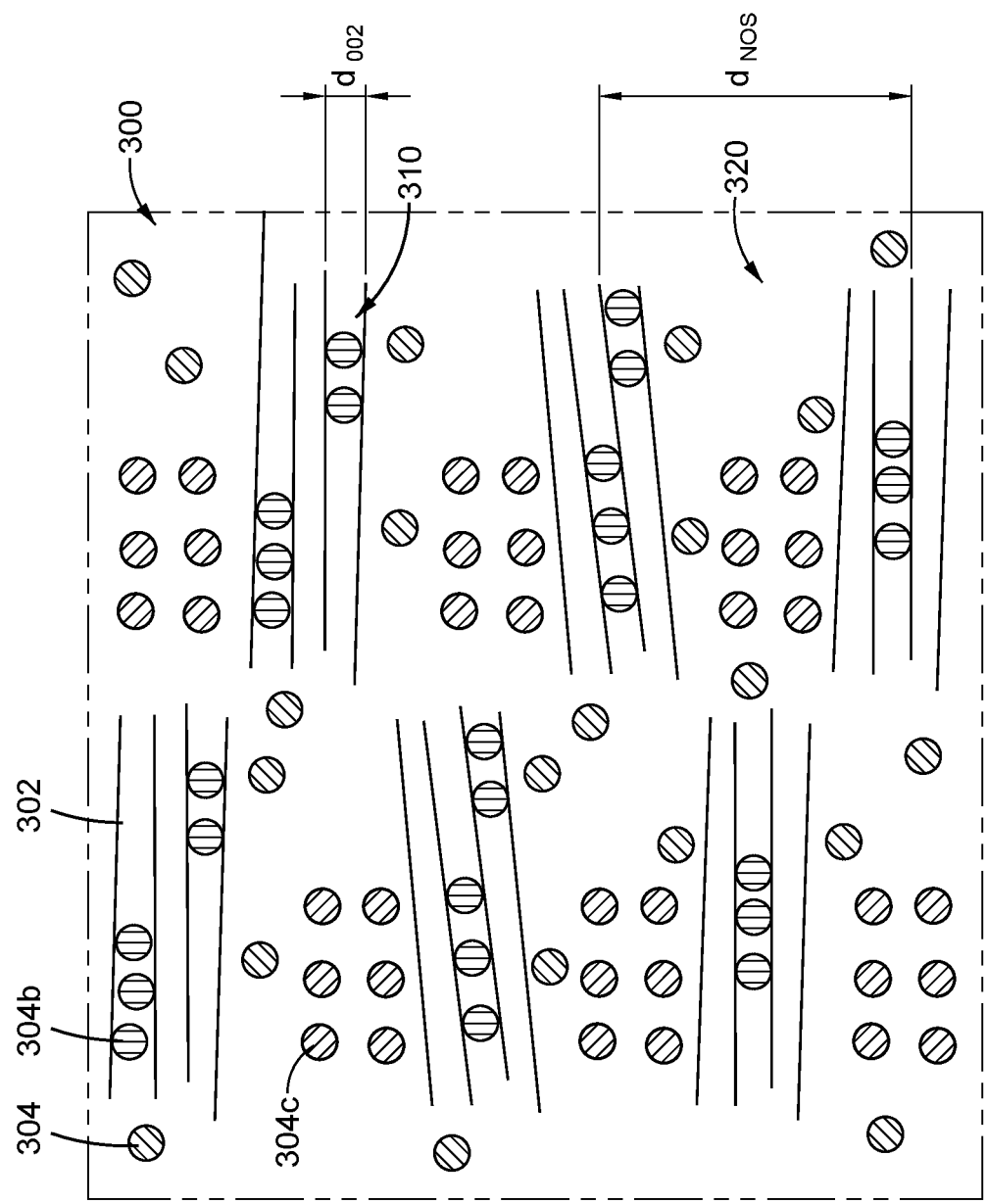
FIG. 3 is a schematic of the structure of porous carbon-containing material as contained within the expanded carbonaceous particles and the coated nano-ordered carbon particles prepared by methods described and discussed herein.

FIG. 3 is a schematic of the structure of porous nano-ordered material and/or nano-ordered material 300 as contained within the expanded carbonaceous particles and the coated nano-ordered carbon particles prepared by methods described and discussed herein. The porous nano-ordered material and/or nano-ordered material 300 has a primary ordered structure 310 and a secondary ordered structure 320. Specifically, the porous nano-ordered material and/or nano-ordered material 300 has two levels of ordered structures: local graphene stack 302 domain as the primary ordered structure 310 and arrangements of graphene stacks 302 as the secondary ordered structures 320. The primary ordered structure 310 is characterized by average interspacing ($d_{002}$) between graphene layers 302. The secondary ordered structure 320 is characterized by average inter-pore spacing ($d_{NOS}$) or average distance between stack centers.

Sodium ions 304 (collectively shown as 304a, 304b, and 304c) are impregnated throughout the porous nano-ordered material and/or nano-ordered material 300. Sodium ions 304a are typically disposed around the edges and/or defective sites on the local graphene stacks 302. Sodium ions 304b are disposed between neighboring graphene layers 302 in the primary ordered structure 310. Sodium ions 304c are disposed as clusters within the pores of the secondary ordered structure 320.

Figure 4:
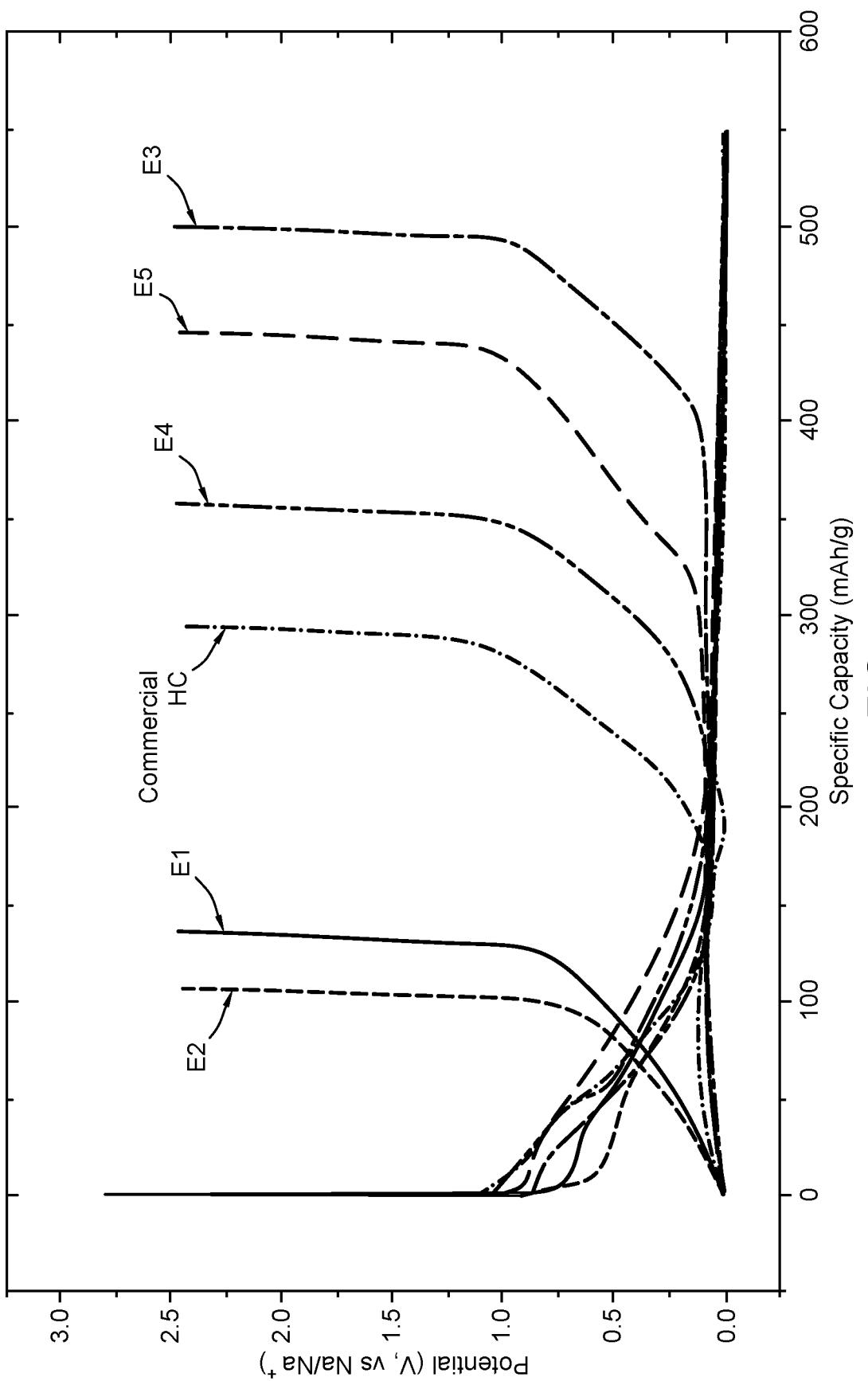
FIG. 4 is a graph illustrating discharge and charge profiles in the first cycle for products prepared by methods described and discussed herein.

As shown in Table I below, E1 and E2 have smaller average d002 spacings, too tight for Na ions to intercalate, and smaller dNOS spacings (smaller pores), allowing less Na ions to form nano-clusters or much less favorable to form nano-clusters. As a result, E1 and E2 achieved much less capacities in Na ion half cell tests, only 136 and 107 mAh/g respectively. As shown in FIG. 4, E1 and E2 shows almost no capacity in plateau region (<0.15 V). At higher carbonization temperature, higher crystallinity in E2 even further impeded Na ion storage. In contrast, the nano-ordered carbon products generated by expanding and annealing of coke material showed larger average d002 and dNO2 spacing, which allows much higher capacity of Na ion storage (500 mAh/g for E3, 356 mAh/g for E4, and 444 mAh/g for E5). However, over-expanding (as in E4) of coke created more defective sites and higher surface area, which resulted in lower first cycle efficiency and reversible capacity. When expanded with proper amount of expanding agents, annealing temperature could also impact the performance of the final products. For example, sample E5, annealed at lower temperature, showed slightly lower capacity and FCE. Although demonstrating different performance, the nano-ordered products produced with the methods in Example 3-5 outperformed commercial hard carbon (purchased from MSE).

| | $d_{002}$ (Å) | $d_{NOS}$ (Å) | Reversible Capacity (mAh/g) | First Cycle Efficiency (%) |
|---|---|---|---|---|
| E1 | 3.48 | <15 | 136 | 70 |
| E2 | 3.47 | <15 | 107 | 63 |
| E3 | 3.7 | >25 | 500 | 91.2 |
| E4 | >4 | >25 | 356 | 71.2 |
| E5 | N/A | N/A | 444 | 84.5 |
| Commercial HC | 3.7-3.8 | <25 | 293 | 86 |

In one or more embodiments, in the beginning of the sodiation process, sodium ions 304a absorb on the edge and defective sites on the local graphene stacks 302, as depicted in FIG. 3. Later, sodium ions 304b intercalate into the interspacing ($d_{002}$) between graphene layers 302, such as in the primary ordered structure 310. Following the intercalation, sodium ions 304c form nano-clusters in the void space or pores between the graphene stacks 302, such as the inter-pore spacing ($d_{NOS}$) of the secondary ordered structure 320.

While the foregoing is directed to embodiments of the disclosure, other and further embodiments may be devised without departing from the basic scope thereof, and the scope thereof is determined by the claims that follow. All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise, whenever a composition, an element, or a group of elements is preceded with the transitional phrase "comprising", it is understood that the same composition or group of elements with transitional phrases "consisting essentially of", "consisting of", "selected from the group of consisting of", or "is" preceding the recitation of the composition, element, or elements and vice versa, are contemplated. As used herein, the term "about" refers to a +/−10% variation from the nominal value. It is to be understood that such a variation can be included in any value provided herein.

Certain embodiments and features have been described using a set of numerical minimum values and a set of numerical maximum values. It should be appreciated that ranges including the combination of any two values, e.g., the combination of any minimum value with any maximum value, the combination of any two minimum values, and/or the combination of any two maximum values are contemplated unless otherwise indicated. Certain minimum values, maximum values, and ranges appear in one or more claims below.

What is claimed is:

1. A method for producing coated nano-ordered carbon particles, comprising:
 exposing a carbon-containing material to an expanding agent to produce expanded carbonaceous particles during an expanding process;
 heating the expanded carbonaceous particles during an annealing process; and
 depositing a carbon film on the expanded carbonaceous particles with nano-ordered structure to produce coated nano-ordered carbon particles during a carbon coating process, wherein the carbon coating process includes a liquid deposition process.

2. The method of claim 1, wherein the carbon-containing material comprises coal coke, petroleum coke, coal pitch, petroleum pitch, coal, a polymeric material, biomass, a bio-derived material, or any combination thereof.

3. The method of claim 1, wherein the expanding agent comprises an alkaline compound, carbonate chemicals, steam, carbon dioxide, phosphoric acid, zinc chloride, aluminum chloride, magnesium chloride, or any combination thereof.

4. The method of claim 1, wherein the expanding agent comprises sodium hydroxide, potassium hydroxide, lithium hydroxide, ammonium hydroxide, or any combination thereof.

5. The method of claim 1, wherein a mixture of the carbon-containing material and the expanding agent is heated to a temperature of about 400° C. to about 1,200° C. for about 5 minutes to about 6 hours during the expanding process.

6. The method of claim 1, wherein after the expanding process and before the annealing process, the expanded carbonaceous particles are exposed to a neutralizing agent to neutralize any remnants of the expanding agent during a neutralization process.

7. The method of claim 1, wherein the expanded carbonaceous particles is heated to a temperature of about 800° C. to about 2,200° C. for about 5 minutes to about 10 hours during the annealing process.

8. The method of claim 1, wherein the expanded carbonaceous particles have an average particle size of about 1 μm to about 50 μm.

9. The method of claim 1, wherein each of the expanded carbonaceous particles comprises:

a primary ordered structure having a $d_{002}$ spacing which is an average interspacing between graphene layers and is about 3.4 Å to less than 4 Å; and a secondary ordered structure having a $d_{NOS}$ spacing which is which is an average inter-pore spacing and is about 15 Å to about 30 Å.

10. The method of claim 1, wherein the carbon film has a thickness of about 1 nm to about 5 μm.

11. The method of claim 1, wherein the coated nano-ordered carbon particles have a first cycle efficiency (FCE) of greater than 88%.

12. The method of claim 1, wherein the coated nano-ordered carbon particles exhibit a specific capacity of greater than 400 mAh/g in a battery voltage of about 0 V to about 3 V.

13. The method of claim 1, wherein the liquid deposition process comprises:

contacting the expanded carbonaceous particles with a liquid solution comprising a carbon-containing precursor;

forming a solid film containing carbon on outer surfaces of the particles; and heating and carbonizing the solid film to form the carbon film on the expanded carbonaceous particles.

14. The method of claim 13, wherein the liquid solution further comprises an organic solvent.

15. The method of claim 1, wherein each of the coated nano-ordered carbon particles comprise a primary ordered structure and a secondary ordered structure, the primary ordered structure has a $d_{002}$ spacing which is an average interspacing between graphene layers, the secondary ordered structure has a $d_{NOS}$ spacing which is an average inter-pore spacing.

16. The method of claim 15, wherein the $d_{002}$ spacing is about 3.5 Å to less than 4 Å and the $d_{NOS}$ spacing is about 15 Å to about 30 Å.

* * * * *